US007674347B2

(12) United States Patent
Ruter et al.

(10) Patent No.: US 7,674,347 B2
(45) Date of Patent: Mar. 9, 2010

(54) METHOD FOR THE PRODUCTION OF A COMBINED PIEZO/LUMINESCENT FILM AND ACTUATING ELEMENT WITH SUCH A PIEZO/LUMINESCENT FILM

(75) Inventors: Karsten Ruter, Landshut (DE); Michael Steckel, Valsbiburg (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 259 days.

(21) Appl. No.: 11/126,263

(22) Filed: May 11, 2005

(65) Prior Publication Data

US 2005/0258710 A1 Nov. 24, 2005

(30) Foreign Application Priority Data

May 12, 2004 (DE) ........................ 10 2004 023 420

(51) Int. Cl.

| | |
|---|---|
| ***B32B 38/14*** | (2006.01) |
| ***B32B 7/04*** | (2006.01) |
| ***B60Q 1/02*** | (2006.01) |
| ***B60Q 1/26*** | (2006.01) |
| *B32B 38/18* | (2006.01) |
| *B32B 37/02* | (2006.01) |
| *B32B 7/10* | (2006.01) |
| *F21V 9/16* | (2006.01) |

(52) U.S. Cl. ........................ 156/277; 156/235; 156/237; 156/310; 362/84; 362/464; 362/487; 318/580

(58) Field of Classification Search ................... 362/84, 362/459, 464, 487–507; 156/235, 237, 277, 156/310; 318/580–589; 200/181; 310/328
See application file for complete search history.

(56) References Cited

U.S. PATENT DOCUMENTS 4,516,112 A 5/1985 Chen (Continued)

FOREIGN PATENT DOCUMENTS

DE 195 28 821 A1 2/1997

(Continued)

OTHER PUBLICATIONS

English Translation of DE10255199, Jul. 10, 2003, European Patent Office.*

(Continued)

*Primary Examiner*—Philip C Tucker
*Assistant Examiner*—Sonya Mazumdar
(74) *Attorney, Agent, or Firm*—Sughrue Mion, PLLC

(57) ABSTRACT

The present invention relates to a method for the production of a combined piezo/luminescent film for use as actuating element, especially in vehicles, comprising the steps: provision of a film-type base material (1); application of a piezoelectric varnish (2) onto the base material at least in a first partial area (A1, A2) so as to form a piezoelectric switch surface in the first partial area; application of a luminescent varnish (3) onto the base material in at least a second partial area (B1, B2) so as to be able to illuminate the switch surface in the second partial area; covering at least of the first and second partial area with a top layer (4) that is bonded to the base material. In addition, the present invention describes an actuating element with a combined piezo/luminescent film produced in such a manner.

11 Claims, 1 Drawing Sheet

U.S. PATENT DOCUMENTS

Figure 1:
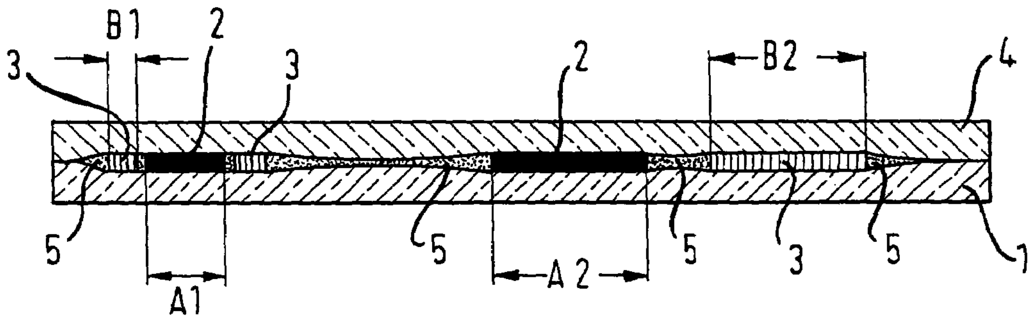

| | | | | |
|---|---|---|---|---|
| 4,521,712 | A | 6/1985 | Braun et al. | |
| 5,374,449 | A * | 12/1994 | Buhlmann et al. | 427/100 |
| 6,120,588 | A * | 9/2000 | Jacobson | 106/31.16 |
| 6,199,996 | B1 | 3/2001 | Katrinecz, Jr. et al. | |
| 6,503,831 | B2 * | 1/2003 | Speakman | 438/674 |
| 6,887,650 | B2 * | 5/2005 | Shimoda et al. | 430/311 |
| 7,564,170 | B2 * | 7/2009 | Steckel | 310/328 |
| 2001/0019323 | A1 | 9/2001 | Ono | |
| 2002/0041926 | A1 * | 4/2002 | Miyashita et al. | 427/66 |
| 2002/0053401 | A1 * | 5/2002 | Ishikawa et al. | 156/309.3 |
| 2002/0066524 | A1 * | 6/2002 | Kagawa et al. | 156/235 |
| 2002/0155215 | A1 * | 10/2002 | Miyashita et al. | 427/66 |
| 2004/0057769 | A1 | 3/2004 | Ward et al. | |
| 2005/0063194 | A1 * | 3/2005 | Lys et al. | 362/545 |

FOREIGN PATENT DOCUMENTS

| | | | |
|---|---|---|---|
| DE | 69 304 443 | T2 | 4/1997 |
| DE | 102 55 199 | | 7/2003 |
| EP | 0 502 452 | A1 | 9/1992 |

OTHER PUBLICATIONS

"Der Lack ist die Lösung", Electromechanik 1, pp. 72-75, Apr. 2002.

* cited by examiner

METHOD FOR THE PRODUCTION OF A COMBINED PIEZO/LUMINESCENT FILM AND ACTUATING ELEMENT WITH SUCH A PIEZO/LUMINESCENT FILM

FIELD OF THE INVENTION

The present invention relates to a method for the production of a combined piezo/luminescent film for use as actuating element especially in vehicles and a related actuating element.

A combined piezo/luminescent film is understood to be an element in which the properties of a conventional piezo film or of a piezoelectric switch element are combined with those of a conventional electroluminescent film or luminescent film. Actuating elements are understood to be especially functional agents or switching elements, which trigger switching operations or serve to input commands, and which in the prior art were previously operated by way of mechanico-electrical pushbuttons.

BACKGROUND OF THE INVENTION

In motor vehicles it is possible to select, activate or deactivate a large number of control functions or on and off switching commands for various types of components by way of actuating elements. Thus it is usual, for example, to control, raise, lower or to open and close the windows, sunroof, exterior mirrors or similar by means of electrically operated positioning motors. Furthermore, a large number of function switches are provided in motor vehicles by way of which the electrical consumers, such as heating, ventilation, lighting elements, radio, on-board computer, navigation system and similar can be operated.

The actuating elements for such functional agents in motor vehicles are usually mounted in the central console, the dashboard and/or on the steering wheel.

The various actuating elements are designed not merely from the point of view of an advantageous mode of operation but must also have an advantageous appearance and surface feel. To this end it is usual, especially in the area of the dashboard and the steering wheel, for the actuating elements to be disposed within a decorative layer. In this case, by making an electrical contact in the conventional manner, the actuating elements activate a control device, which controls the individual positioning motors for the functional agents.

The actuating elements are mostly disposed in the decorative layer in the form of pushbuttons so that they are raised perceptibly proud of the surface. However, this tangible arrangement of the actuating elements means that the decorative layer must be of interrupted design in the area of said actuating elements. Conversely this leads, especially in the area of transitions from the decorative layer to the individual actuating elements, to the creation of joints in which dirt collects over time, which can impair both the mode of operation of the actuating elements and also the appearance of the whole decorative layer.

According to the applicant's knowledge, the problems referred to above can be eliminated by the use of piezoelectric actuating elements instead of the conventional actuating elements. In this case the decorative layer can be designed as substantially closed, whereby a piezoelectric element is disposed underneath the actuating elements represented visually on the decorative layer. This piezoelectric element is advantageously a piezoelectric film.

Piezoelectric switches, for example for Ceran cooker tops, coffee machines or "vandal-proof" keypads, are known for instance from DE 69 304 443 T2. This printed matter also discloses the method of production for a piezoelectric film or piezo film so that the production of a piezo film can essentially be considered as known to a person of ordinary skill in the art. Thus a precise description of the production of a piezo film is omitted in the following. However, it should be noted that in the production of a piezo film, a piezoelectric varnish and insulating layers are generally applied to a base material by means of a screen printing technique.

Nowadays switches and actuating elements of all types in the vehicle must be illuminated so that they can be found effortlessly even in the dark. In this case a distinction is made between pilot lighting and functional lighting.

Functional lighting serves to display an activity and must also be visible by day. This is mostly achieved by means of LEDs or light bulbs. Pilot lighting serves to determine the position of individual switches at night. This can occur in a motor vehicle in different ways and means, e.g. by indirect illumination of the whole switch surface, backlighting of an individual switch (by light bulbs) or of the whole switch surface (e.g. by a luminescent film) or also by low-energy luminescent light-emitting diodes adjacent to them.

The use of light bulbs, however, is eliminated for piezoelectric technology. Furthermore, the applicant's investigations have shown it to be advantageous to use a luminescent film in conjunction with piezoelectric switches or piezoelectric actuating elements. The production of a luminescent film is generally known to a person of ordinary skill in the art, whereby a luminescent material is applied as a rule together with electrodes to a base material by means of a screen printing technique.

Based on the explanations referred to above, the applicant came to the conclusion that a combination of piezo film and luminescent film is advantageous for the production of an actuating element for a vehicle, which simultaneously solves the problems of the prior art and can additionally be provided easily with pilot lighting.

Up to now this combined piezo/luminescent film has been produced in such a way that piezo films and luminescent films are produced independently of each other. For example, a piezo film is produced according to the disclosure of DE 69 304 43 T2 and a luminescent film as is described for example in DE 102 55 199 A1. The two piezo films and luminescent films produced independently of each other are preferably bonded by gluing the individual elements together in order to produce a laminate.

DESCRIPTION OF THE INVENTION

The technical problem on which the present invention is based lies in providing a method for the production of a combined piezo/luminescent film for use as actuating element, which is substantially improved and simplified compared with the method referred to above, so that an appropriate actuating element with such a piezo/luminescent film can be produced at lower manufacturing costs, with improved functional properties and a lower weight.

Thus the present invention is based on the idea of replacing the two production processes of the piezo films and luminescent films produced independently of each other with one combined production process. With such a combined production process it is possible to achieve lower manufacturing costs and in addition a combined piezo/luminescent film is produced, which is improved in respect of its weight and functional properties.

Thus the present invention proposes a method for the production of a combined piezo/luminescent film for use as actuating element especially in vehicles. According to the patent the method covers first of all the provision of a film-type base material. Accordingly the base material can, for example, be a self-supporting film of an organic polymer compound that consists substantially of an electrically insulating thermoplastic or duroplastic polymer. Representative examples are, amongst other things, films of technically obtainable polyesters, polycarbonates, polypropylenes, polyamides, polyacetylenes, etc. with usual thicknesses ranging from approximately 50 to 2000 μm. A piezoelectric varnish is applied to this base material at least in a first partial area. Piezoelectric varnishes for application to a base are known to a person of ordinary skill in the art so that no further explanation is necessary in this respect. After curing, the piezoelectric varnish forms a piezoelectric switch surface or a piezoelectric switch in a first partial area. The contact connections to the piezoelectric switch can also be applied to the base material at the same time as or separately from the piezoelectric varnish.

Furthermore, in a further step according to the invention, a luminescent varnish or a luminescent functional layer or an electroluminescent layer is applied to the base material, whereby this is carried out at least in a second partial area. The properties of the luminescent varnish are also known from the production of separate luminescent films so that no further detailed explanations are necessary in this respect. After curing, the luminescent varnish forms a luminescent layer, which illuminates the switch surface in the second partial area if it is activated via electrodes. The electrodes may be applied to the base material at the same time or separately and may, for example, be provided by sputtering. Once the piezoelectric varnish and the luminescent varnish have been applied to the base material, a top layer is provided for protection over at least the first and second partial area so as to cover the piezoelectric varnish and the luminescent varnish. The top layer is then bonded to the base material either directly or by way of other materials. By means of this method according to the invention, it is possible to combine the production processes of the known independent elements, piezo film and luminescent film, in one operation to produce a combined piezo/luminescent film. This method is substantially simplified by comparison with the conventional method used, which has been described previously and in which the separate piezo film and luminescent film were laminated with each other. Furthermore, by the method according to the invention, a combined piezo/luminescent film is produced, which has improved functional properties and a lower weight at lower manufacturing costs.

In an advantageous manner the piezoelectric varnish and/or the luminescent varnish are applied to the base material by means of a screen printing technique. The screen printing technique provides a simple and inexpensive method. Furthermore, it is possible to achieve any design and development of the switch surface and illuminated area by appropriate selection of the screen printing templates. In addition, the production process may be carried out in a single machine. Thus, for example, the piezoelectric varnish and the luminescent varnish may be applied simultaneously or separately.

Depending on the visual decorative surface desired, the first and second partial areas may be disposed adjacent to one another or may, however, advantageously overlap at least partially. If the first and second partial areas overlap, the luminescent varnish is applied after application of the piezoelectric varnish so that the luminescent layer is disposed on a side of the combined piezo-luminescent film facing the decorative side. This is necessary so that the piezoelectric element does not cover up the luminescent film thus preventing the illumination from being visible from one side of the decorative panel.

If the luminescent varnish and the piezoelectric varnish are applied separately, it is preferable to apply an electrically insulating layer between application of the piezoelectric varnish and the luminescent varnish. This operation can also be carried out in a printing process.

Alternatively, the piezoelectric varnish and the luminescent varnish are applied directly to the base material.

The piezoelectric element is preferably a so-called sandwich element in which the step involving application of a piezoelectric varnish to the base material in the first partial area is repeated at least once with interposition of an insulating layer in the first partial area so that a composite of layers of piezoelectric varnish and insulating material disposed one on top of the other is produced. In other words, for example, first a layer of piezoelectric varnish, then a layer of insulating material and then again a piezoelectric varnish layer are applied.

The luminescent element is also a so-called sandwich element. A conductive layer is applied in the second partial area prior to applying the luminescent varnish on the base material in the second partial area and likewise following application of the luminescent layer so that a composite of layers of luminescent varnish and conductive material disposed one on top of the other is produced in the second partial area.

The top layer is translucent at least in the second partial area or a part of it so that the illumination remains visible from the decorative side or the side of the top layer.

In addition to the method according to the invention, the present invention also proposes an actuating element especially for vehicles, and in particular for motor vehicles, which has a combined piezo/luminescent film produced according to the method of the preceding claims and a decorative surface disposed opposite the base material on the side of the top layer. This design achieves an actuating element, which facilitates improved functional properties at a lower weight and lower production costs.

In an advantageous manner, by way of the method according to the invention, it is possible to use a combined piezo/luminescent film in an actuating element that only has one outgoing cable. This simplifies the attachment of contact parts and further reduces the actuating element's production costs. Furthermore, it also simplifies connector assembly when installing the actuating element, e.g. in a vehicle.

In an advantageous manner, the piezo/luminescent film used in the actuating element includes at least two switch surfaces, so that the actuating element can combine several switching functions in one element.

Further features and advantages of the present invention may be inferred individually or in combination from the following description of preferred embodiments of the present invention. The description of embodiments of the present invention is provided on the basis of the accompanying drawings.

SHORT DESCRIPTION OF THE DRAWINGS

The same reference characters in the various views indicate the same or corresponding parts in the drawings.

Figure 2:
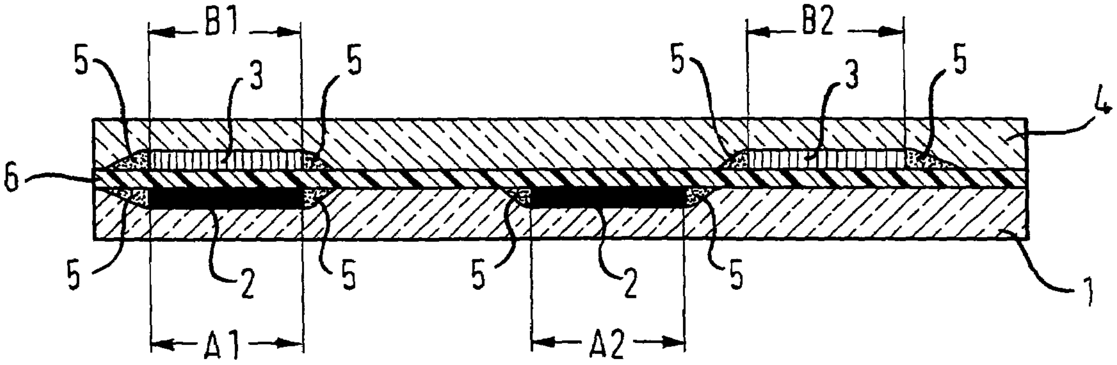

The drawings show:

FIG. 1 a combined piezo/luminescent film according to the present invention in cross-section, whereby the piezo varnish and the luminescent varnish are applied directly to the base material FIG. 2 a combined piezo/luminescent film according to the present invention in cross-section, whereby an electrically insulating layer is provided between the piezoelectric varnish and the luminescent varnish.

DESCRIPTION OF EMBODIMENTS OF THE PRESENT INVENTION

With reference to FIG. 1, a combined piezo/luminescent film, which is produced by the method according to the invention in line with a first embodiment, includes a base 1, a piezoelectric layer 2 applied to base 1 and a luminescent layer 3 also applied to the base. A top layer 4, which is bonded to base 1 by means of adhesive 5, is disposed on base 1 and covers piezoelectric layer 2 and luminescent layer 3.

This piezo/luminescent film according to the invention is manufactured by the method according to the invention in line with a first exemplary embodiment. First of all a film-type base material is provided as base 1. Subsequently, a piezoelectric varnish 2 is applied by means of screen printing in a partial area A1 and A2. In addition, a luminescent varnish is applied in a second partial area B1 and B2 also by means of screen printing. In the embodiment presented both piezoelectric varnish 2 and also luminescent varnish 3 are applied directly to base material 1. This process may be carried out simultaneously or separately. Furthermore, the conductive areas (not shown) associated with the piezoelectric varnish, which electrically contact the piezoelectric element, and the electrodes (not shown) of the luminescent varnish are applied simultaneously or separately. This can also be effected in a printing process.

As can be seen from FIG. 1, the design or form of the luminescent varnish or luminescent element 3 and of the piezoelectric varnish or piezoelectric element 2 respectively can be of any shape due to the printing process. Thus, for example, piezoelectric element 2 in partial area A1 can adopt a substantially round, circular shape and luminescent element 3 provided in partial area B1 can surround this circular piezoelectric element in an annular shape.

Alternatively, piezoelectric element 2 and luminescent element 3 in partial areas A2 and B2 can also be disposed completely adjacent to each other.

Once piezoelectric varnish 2 and luminescent varnish 3 have been applied and cured, a top layer 4, which at least covers partial areas A1, A2 and B1, B2, is provided on base 1. In the present embodiment shown, top layer 4 covers the whole of base 1 and is bonded to base 1 by way of an adhesive layer 5. In an advantageous manner, the top layer is translucent at least in areas B1 and B2 so that the illumination is visible from the side of top layer 4.

FIG. 2 shows a piezo/luminescent film produced according to an alternative method in line with a second embodiment of the present invention. The piezo/luminescent film shown corresponds substantially to the piezo/luminescent film shown in FIG. 1. The substantial difference, however, lies in the fact that an electrically insulating layer 6 is provided between piezoelectric varnish 2 and luminescent varnish 3.

In the method according to the invention for the production of a piezo/luminescent film shown in FIG. 2, a base 1 is initially provided in the form of a film-type material. Piezoelectric varnish 2 is then applied directly on this base material 1 in partial area A1 and A2. An electrically insulating layer 6 is applied following this step. Electrically insulating layer 6 is applied over the whole of base 1 in the embodiment shown. This can be effected by cementing using an adhesive 5. Alternatively, an insulating varnish can also be used, which is applied in a printing process similarly to piezo varnish 2 and luminescent varnish 3.

Subsequently, luminescent varnish 3 is applied to base 1, whereby the luminescent varnish does not come into direct contact with base 1 but rather with electrically insulating layer 6, which in turn is in contact with the base. As shown in FIG. 2, first partial area A1 of piezoelectric varnish 2 and second partial area B1 of luminescent varnish 3 may overlap each other in some areas. In the embodiment shown, first partial area A1 and second partial area B1 actually overlap each other completely. Likewise first partial area A2 and second partial area B2 can also be disposed adjacent to each other so that they do not overlap one another.

Following this a top layer 4 is applied, which in this case is bonded with the base by way of electrically insulating layer 6. In an advantageous manner top layer 4 is cemented to insulating layer 6 by the use of an adhesive. As already mentioned in the previous embodiment, top layer 4 is translucent in second partial area B1 and second partial area B2. As a result the luminance of luminescent layer 3 is visible from the side of top layer 4 if the luminescent layer is activated by way of the electrodes (not shown). The composition of a piezoelectric varnish or a luminescent varnish, and the electronic wiring or connection thereof, are known to the person of ordinary skill in the art from the separate production of the relevant elements. Accordingly, no further explanation is given in respect of the composition of the piezoelectric varnish and the luminescent varnish and of their electrical connection.

In an actuating element according to the invention, a decorative surface is disposed on the side of top layer 4. The decorative surface may be a separate element, whereby the combined piezo/luminescent film is bonded to it, or top layer 4 may be designed in such a way that it forms the decorative surface.

The accurate description provided above of preferred embodiments of the present invention and the accompanying drawings serve merely to illustrate the present invention. However, the scope of the present invention is in fact defined by the following patent claims.

The invention claimed is:

1. Method for the production of a combined piezo/luminescent film for use as actuating element, especially in vehicles, comprising the steps:

providing a film-type base material;

applying a piezoelectric varnish onto the base material at least in a first partial area so as to form a piezoelectric switch surface serving to input commands in the first partial area, the piezoelectric varnish being electrically contacted by means of conductive areas;

applying an electroluminescent varnish onto the base material in at least a second partial area and connecting the electroluminescent varnish via electrodes, whereby the electroluminescent varnish can be activated so as to be able to illuminate the switch surface in the second partial area by the activated electroluminescent varnish; and covering at least one of the first and second partial areas with a top layer that is bonded to the base material.

2. Method according to claim 1, wherein the piezoelectric varnish and/or the electroluminescent varnish are applied to the base material by means of a screen printing technique.

3. Method according to claim 1, wherein the first and the second partial areas overlap at least in some areas.

4. Method according to claim 1, wherein an electrically insulating layer is applied additionally between application of the piezoelectric varnish and the electroluminescent varnish.

5. Method according to claim 1, wherein the piezoelectric varnish and the electroluminescent varnish are applied directly to the base material.

6. Method according to claim 1, wherein the step of applying the piezoelectric varnish to the base material in the first partial area is repeated at least once in each case with interposition of an insulating layer in the first partial area so that a composite of layers of piezoelectric varnish and insulating layers disposed one on top of the other is produced in the first partial area.

7. Method according to claim 1, further comprising the step of applying a conductive layer to the second partial area before and after the step of applying electroluminescent varnish so that a composite of layers of electroluminescent varnish and conductive material disposed one on top of the other is produced in the second partial area.

8. Method according to claim 1, wherein the top layer is translucent at least in the second partial area.

9. Method according to claim 1 wherein the electroluminescent varnish is non-organic.

10. Method according to claim 1, wherein the piezoelectric varnish and the electroluminescent varnish are only applied to one base material.

11. Method according to claim 1, wherein the piezoelectric varnish and the electroluminescent varnish are applied onto the base material by screen printing.

* * * * *